UNITED STATES PATENT OFFICE.

JAY DELL GE BOTT, OF ONALASKA, TEXAS.

BRAZING COMPOUND.

1,037,234. Specification of Letters Patent. Patented Sept. 3, 1912.

No Drawing. Application filed November 6, 1911. Serial No. 658,774.

*To all whom it may concern:*

Be it known that I, JAY DELL GE BOTT, a citizen of the United States, residing at Onalaska, in the county of Polk and State of Texas, have invented certain new and useful Improvements in Brazing Compounds; and I do declare the following to be a full, clear, and exact description of the invention, such as will enable others skilled in the art to which it appertains to make and use the same.

This invention relates to a new and useful composition of matter to be used for brazing band saws, silver and tinware and any other metals capable of being brazed together.

My improved composition consists of the following ingredients combined in the proportions stated, viz:—pure muriatic acid, 8 oz.; zinc in such quantities as will be dissolved by the acid, which is about four (4) ounces; pure rain water, one pint; sal ammoniac, 3 oz.; powdered rosin, 3 oz.; cochineal, 1 oz. These ingredients are thoroughly mixed by agitation and are then strained through absorbent cotton until all sediment is removed, making a liquid which is absolutely free from grit, dirt and all foreign matter.

In the above composition the muriatic acid is employed for removing the dirt from the metal. As the acid in its pure state is too strong for the purpose intended, it is reduced by the addition of as much zinc as will be dissolved without leaving a sediment. The rain water is added until the proper strength of acid is obtained. The sal ammoniac being a chemical known to have adhesive qualities is then added together with the powdered rosin which also has adhesive qualities. These ingredients in the proportions named form a combination of chemicals which will work together in harmony to form a flux when heat is applied to the metal to be brazed either by the application of a hot iron or by a blow torch. The cochineal is simply employed for coloring the compound.

My improved compound when used as directed will not carbonize the metal but will leave the same virtually in its normal state. The compound will prevent the irons from sticking to the metal after cooling and will cause the solder to flow freely between the laps of the metal thus making a braze that will be lasting and strong.

I claim:

The herein described composition of matter for use in connection with brazing metals consisting of pure muriatic acid, 8 oz.; zinc 4 oz.; pure rain water 1 pint; sal ammoniac 3 oz.; powdered rosin, 3 oz.; and cochineal 1 oz.; substantially as described.

In testimony whereof I have hereunto set my hand in presence of two subscribing witnesses.

JAY DELL GE BOTT.

Witnesses:
C. W. JAMES,
C. M. ACKER.